United States Patent

(12) United States Patent
Lin

(10) Patent No.: US 8,200,431 B2
(45) Date of Patent: Jun. 12, 2012

(54) NAVIGATION SYSTEM CAPABLE OF UPDATING MAP DATA AND METHOD THEREOF

(75) Inventor: Chun-Hung Lin, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 513 days.

(21) Appl. No.: 12/490,340

(22) Filed: Jun. 24, 2009

(65) Prior Publication Data

US 2010/0057356 A1   Mar. 4, 2010

(30) Foreign Application Priority Data

Sep. 3, 2008   (TW) ............................. 97133711 A

(51) Int. Cl.
G01C 21/36 (2006.01)

(52) U.S. Cl. ........................................ 701/533; 701/24

(58) Field of Classification Search .................. 701/400, 701/408–409, 28, 468, 24–25, 533; 348/113, 348/118; 340/988
See application file for complete search history.

(56) References Cited

U.S. PATENT DOCUMENTS

| | | | |
|---|---|---|---|
| 2007/0037605 A1* | 2/2007 | Logan | 455/567 |
| 2007/0124068 A1* | 5/2007 | Nakayama et al. | 701/210 |
| 2011/0118972 A1* | 5/2011 | Boschker | 701/200 |
| 2011/0224901 A1* | 9/2011 | Aben et al. | 701/208 |

* cited by examiner

*Primary Examiner* — Yonel Beaulieu
(74) *Attorney, Agent, or Firm* — Winston Hsu; Scott Margo

(57) ABSTRACT

A navigation system includes a plurality of navigation devices and a server. The plurality of navigation devices is used for generating a plurality of position data respectively. Each navigation device generates at least one path data according to the plurality of position data and at least one corresponding electronic map and transmits the path data to the server. Then, the server calculates at least one optimum path data and updates the plurality of navigation devices according to the optimum path data.

16 Claims, 4 Drawing Sheets

NAVIGATION SYSTEM CAPABLE OF UPDATING MAP DATA AND METHOD THEREOF

BACKGROUND OF THE INVENTION

1. Field of the Invention

The invention relates to a navigation system and method thereof and, more particularly, to a navigation system capable of updating map data and method thereof.

2. Description of the Prior Art

As satellite positioning technology advanced, global positioning system (GPS) has been more and more popular in daily life. A navigation device is representative of using GPS.

In general, the most important function of the navigation device is to ensure the correctness of map data. Without correct map data, the navigation device cannot assist a user in guiding traffic even if the GPS can provide accurate coordinate. Furthermore, the inaccurate navigation device may cause the user to make wrong judgment. Therefore, how to update the map data is very important for the navigation device. However, the map data is always updated by service provider nowadays. The service provider has to assign operating staff to examine and correct the map data, so it will take a lot of time and efforts. Furthermore, due to a huge amount of data, the map data of the navigation device will be updated slowly, so that the map data provided by the navigation device is usually inaccurate. Moreover, since the map data is updated by the service provider, it cannot satisfy the requirement of each subscriber frequently.

SUMMARY OF THE INVENTION

The invention provides a navigation system capable of updating map data. The navigation system comprises a plurality of navigation devices and a server. Each of the navigation devices comprises a global positioning system unit, a map data unit, a micro-processing unit, a data feedback unit, and a first signal transmitting unit. The global positioning system unit is used for generating a plurality of position data. The map data unit is used for providing at least one electronic map corresponding to the plurality of position data. The micro-processing unit, which is coupled to the global positioning system unit and the map data unit, is used for generating at least one path data according to the plurality of position data and the electronic map. The data feedback unit, which is coupled to the micro-processing unit, is used for storing the path data. The first signal transmitting unit, which is coupled to the data feedback unit, is used for outputting the path data. The server comprises a second signal transmitting unit, a calculating unit, and an updating unit. The second signal transmitting unit is used for receiving a plurality of path data transmitted from a plurality of first signal transmitting units of the plurality of navigation devices. The calculating unit, which is coupled to the second signal transmitting unit, is used for calculating an optimum path data according to the plurality of path data received by the second signal transmitting unit. The updating unit, which is coupled to the calculating unit, is used for updating the map data unit according to the optimum path data.

The invention further provides a method for updating map data. The method comprises the following steps of generating a plurality of position data by a plurality of navigation devices respectively, generating at least one path data by each navigation device according to the plurality of position data thereof and at least one electronic map corresponding to the plurality of position data, transmitting the path data to a server by each navigation device, calculating at least one optimum path data by the server according to a plurality of path data, and updating the plurality of navigation devices by the server according to the optimum path data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
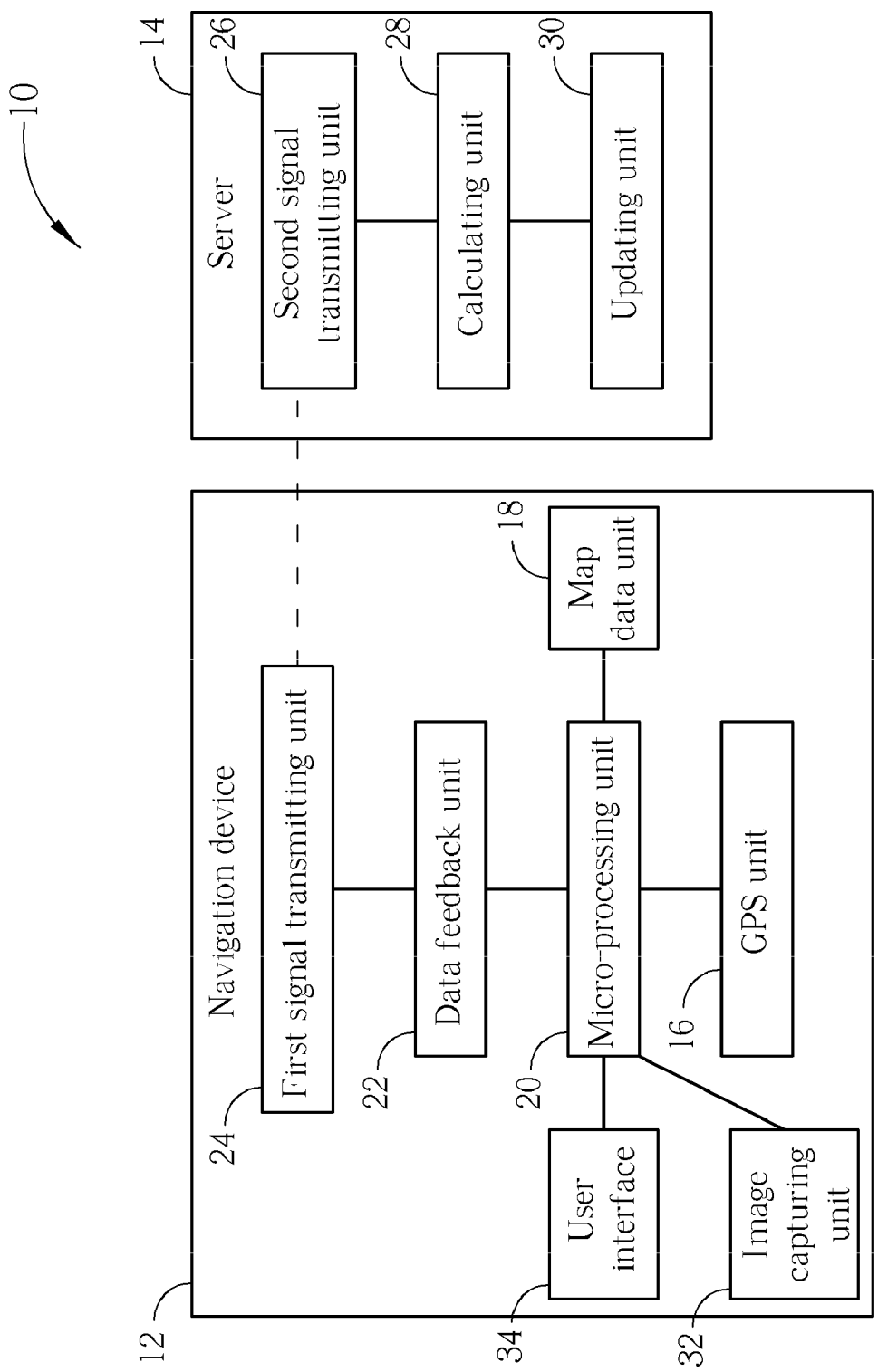
FIG. 1 is a functional block diagram illustrating a navigation system according to the present invention.

Referring to FIG. 1, FIG. 1 is a functional block diagram illustrating a navigation system 10 according to the present invention. The navigation system 10 comprises a plurality of navigation devices 12 and a server 14, wherein FIG. 1 only shows one navigation device for illustrative purpose, and the functions and structure of each navigation device are substantially the same. The server 14 can be provided by a service provider.

Each of the navigation devices 12 comprises a global positioning system (GPS) unit 16, a map data unit 18, a micro-processing unit 20, a data feedback unit 22, and a first signal transmitting unit 24. The GPS unit 16 is used for receiving signals from satellite to generate a plurality of position data. The map data unit 18 is used for providing at least one electronic map corresponding to the plurality of position data. The micro-processing unit 20, which is coupled to the GPS unit 16 and the map data unit 18, is used for generating at least one path data according to the plurality of position data and the electronic map. The data feedback unit 22, which is coupled to the micro-processing unit 20, is used for storing the path data. The first signal transmitting unit 24, which is coupled to the data feedback unit 22, is used for outputting the path data.

The server 14 comprises a second signal transmitting unit 26, a calculating unit 28, and an updating unit 30. The second signal transmitting unit 26 is used for receiving a plurality of path data transmitted from a plurality of first signal transmitting units 24. For example, the second signal transmitting unit 26 can receive the path data in wireless manner. The calculating unit 28, which is coupled to the second signal transmitting unit 26, is used for calculating an optimum path data according to the plurality of path data received by the second signal transmitting unit 26. The updating unit 30, which is coupled to the calculating unit 28, is used for updating the map data unit 18 according to the optimum path data. For example, the optimum path data can be transmitted to the first signal transmitting unit 24 of the navigation device 12 by the second signal transmitting unit 26, so as to update the map data unit 18 of the navigation device 12.

Furthermore, each navigation device 12 can further comprise an image capturing unit 32, such as a camera or the like. The image capturing unit 32, which is coupled to the micro-processing unit 20, is used for capturing an image corresponding to a position data. Then, the micro-processing unit 20 stores the image and the position data into the data feedback unit 22, and the micro-processing unit 20 controls the first signal transmitting unit 24 to transmit the image and the position data stored in the data feedback unit 22 to the server 14 thereafter.

Figure 2:
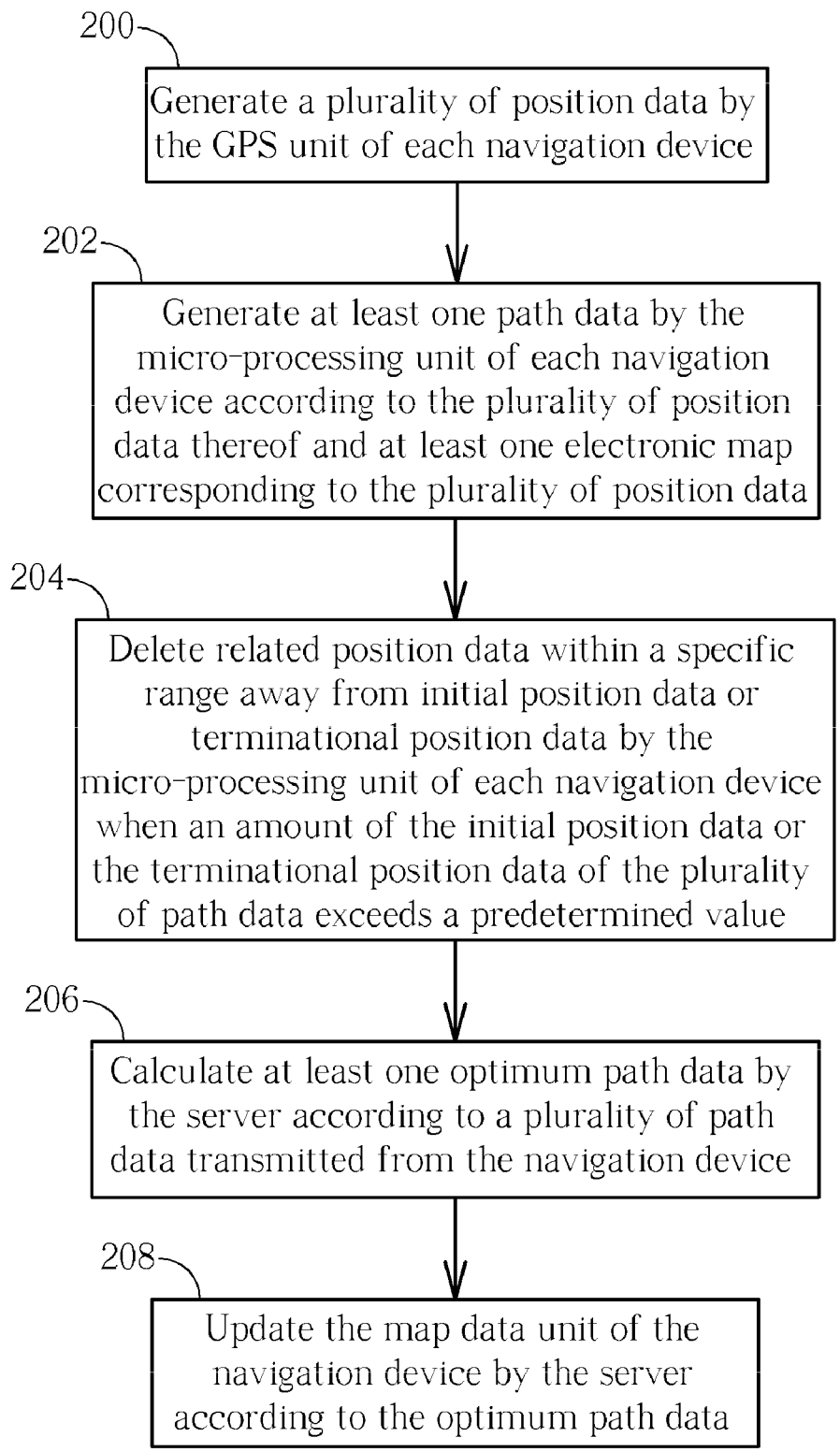
FIG. 2 is a flowchart illustrating a method for updating map data according to the present invention.

Referring to FIG. 2, FIG. 2 is a flowchart illustrating a method for updating map data according to the present invention. The method comprises the following steps.

Step 200: Generate a plurality of position data by the GPS unit 16 of each navigation device 12.

Step 202: Generate at least one path data by the micro-processing unit 20 of each navigation device 12 according to the plurality of position data thereof and at least one electronic map corresponding to the plurality of position data.

Step 204: Delete related position data within a specific range away from initial position data or terminational position data by the micro-processing unit 20 of each navigation device 12 when an amount of the initial position data or the terminational position data of the plurality of path data exceeds a predetermined value.

Step 206: Calculate at least one optimum path data by the server 14 according to a plurality of path data transmitted from the navigation device 12.

Step 208: Update the map data unit 18 of the navigation device 12 by the server 14 according to the optimum path data.

The aforesaid steps will be depicted in detail as follows. First of all, in the Step 200, the GPS unit 16 of each navigation device 12 generates a plurality of position data. In other words, when a user switches the navigation device 12 on at an initial position before he or she switches the navigation device 12 off at a terminational position or stays at a specific position for a long time (e.g. half an hour), the navigation device 12 takes that as a driving path and the GPS unit 16 provides a plurality of position data along the driving path. At the same time, the map data unit 18 provides an electronic map corresponding to the plurality of position data. Afterwards, the micro-processing unit 20 generates a path data according to the plurality of position data provided by the GPS unit 16 and the electronic map provided by the map data unit 18. Therefore, there will be a plurality of path data stored in the data feedback unit 22 while the number of driving times increases.

It should be noted that the path data is recorded by the data feedback unit 22 every time while the user drives through each path. Therefore, if the user usually drives between some locations, such as from home to company, the location where the user usually appears will be derived easily according to the path data stored in the data feedback unit 22. To ensure the privacy right of the user, in the Step 204, the micro-processing unit 20 controls the data feedback unit 22 to delete related position data within a specific range (e.g. two kilometers) away from initial position data or terminational position data when an amount of the initial position data or the terminational position data of the plurality of path data exceeds a predetermined value (e.g. 100 path data). For example, when the path data with an initial position A has been stored in the data feedback unit 22 over 100 times, i.e. the position data of the initial position A has been stored in the data feedback unit 22 over 100 times, the micro-processing unit 20 will control the data feedback unit 22 to delete some path data with the initial position A within two kilometers away from the initial position A. Accordingly, the path data with the initial position A is replaced by one new path data with new initial position A'. Afterwards, the new path data is stored to the data feedback unit 22, such that the privacy right of the user can be ensured.

The Step 206 will be depicted in detail as follows. When a span of time goes by or an amount of path data stored in the data feedback unit 22 exceeds a predetermined value, the micro-processing unit 20 will control the first signal transmitting unit 24 to output the path data stored in the data feedback unit 22 to the server 14. After the second signal transmitting unit 26 of the server 14 receives a specific amount of path data from each navigation device 12, the calculating unit 28 of the server 14 calculates the optimum path data corresponding to different positions according to a plurality of path data transmitted from each navigation device 12. For example, if the server 14 wants to generate the optimum path data with an initial position B and a terminational position C, the calculating unit 28 will gather statistics for the path data with the initial position B and the terminational position C, so as to obtain a path data which most of users have drive through. Then, the obtained path data is set as the optimum path data with the initial position B and the terminational position C.

Moreover, each path data transmitted from the aforesaid navigation device 12 can comprise time data, such as a required driving time between the initial and terminational positions or a span of time corresponding to each path data. According to the time data included in each path data transmitted from each navigation device 12, the calculating unit 28 can estimate the optimum path data corresponding to different positions or time spans (e.g. working time) or estimate the required driving time corresponding to different paths. That is to say, from the initial position B to the terminational position C, the driving path, which most of users choose to drive, may be the smoothest path rather than the shortest path. For example, the optimum path data may represent a path without a traffic jam during a specific span of time or a path with the lowest traffic signs. In other words, the server 14 can obtain the optimum driving path according to the feedback of driving experience from each user.

It should be noted that the manner of transmitting path data depicted in the Step 206 is not limited to the aforesaid manner. The user can also selectively transmit the path data stored in the data feedback unit 22 to the server 14. For example, the navigation device 12 can further comprise a user interface 34 (see FIG. 1), which is coupled to the micro-processing unit 20. The user interface 34 is used for inputting commands to control the first signal transmitting unit 24 to transmit the path data stored in the data feedback unit 22 to the server 14. In this embodiment, the user interface 34 can be a touch screen. That is to say, the user can operate the user interface 34 to actively transmit the path data stored in the data feedback unit 22 to the server 14, so as to assist the server 14 in updating the map data. In another embodiment, the user interface can be a keypad, a plurality of buttons or other input components. Furthermore, the user interface 34 can be used for inputting commands to adjust the predetermined value and the specific range. The micro-processing unit 20 controls the data feedback unit 22 to delete related position data within the specific range away from the initial position data or the terminational position data when an amount of initial position data or terminational position data of the plurality of path data stored in the data feedback unit 22 exceeds the predetermined value.

After the calculating unit 28 of the server 14 calculates the optimum path data corresponding to different positions according to the plurality of path data transmitted from each navigation device 12, the server 14 integrates the optimum path data into the next version of map data. When each navigation device 12 proceeds to update the map data next time, the server 14 will transmit the updated version of map data to each navigation device 12, so as to update the data stored in the map data unit 18 (Step 208).

The navigation system 10 of the invention can further comprise the features of feeding back unknown position data and updating position information except the aforesaid features.

Figure 3:
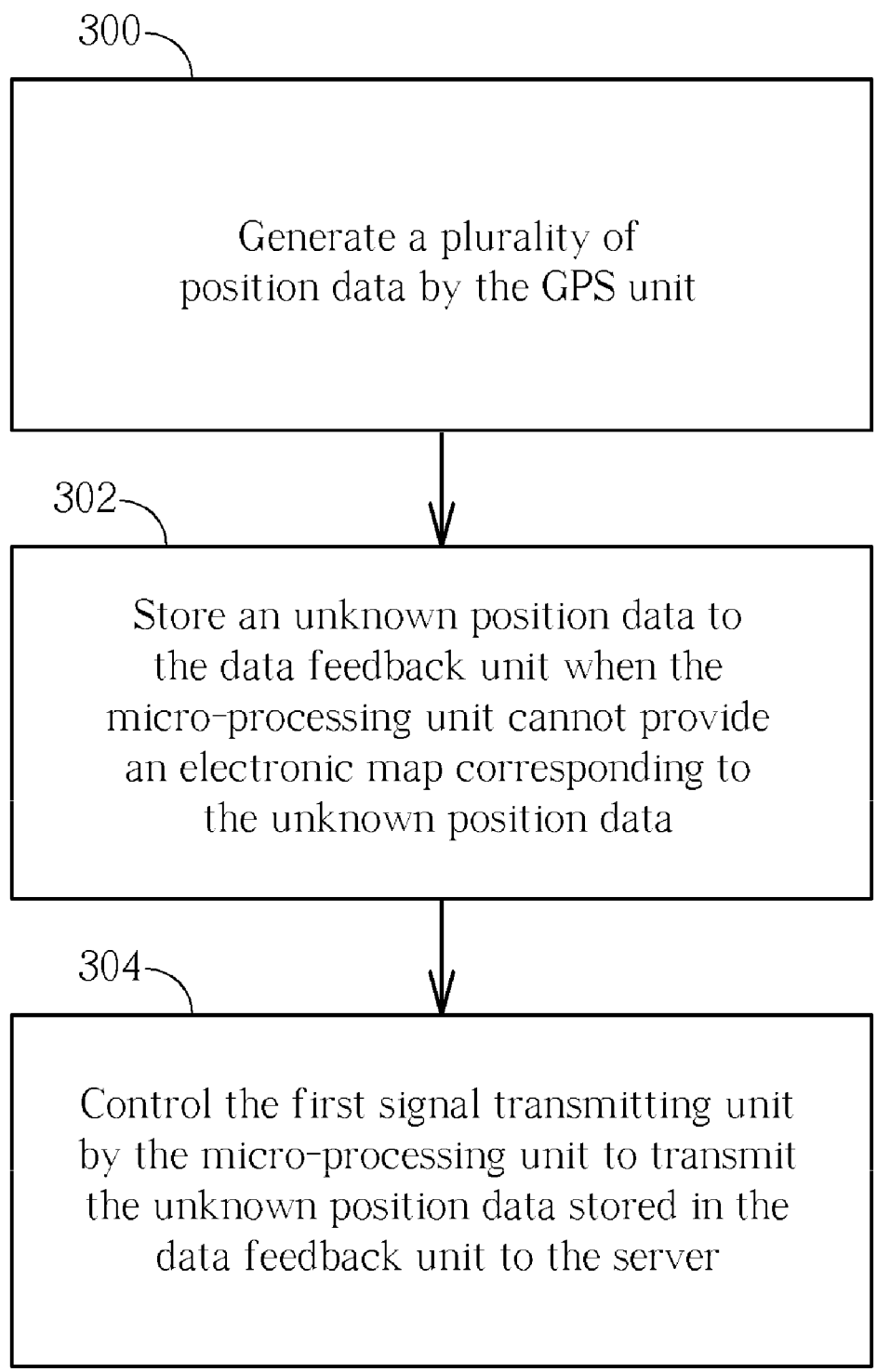
FIG. 3 is a flowchart illustrating a method of feeding back unknown position data according to the present invention.

The function of feeding back unknown position data will be depicted in detail as follows. Referring to FIG. 3, FIG. 3 is a flowchart illustrating a method of feeding back unknown position data according to the present invention. The method comprises the following steps.

Step 300: Generate a plurality of position data by the GPS unit 16.

Step 302: Store an unknown position data to the data feedback unit 22 when the micro-processing unit 20 cannot provide an electronic map corresponding to the unknown position data.

Step 304: Control the first signal transmitting unit 24 by the micro-processing unit 20 to transmit the unknown position data stored in the data feedback unit 22 to the server 14.

The steps in FIG. 3 will be depicted in detail as follows. When the user switches the navigation device 12 on, the GPS unit 16 of the navigation device 12 will generate a plurality of position data according to the driving path, and the map data unit 18 of the navigation device 12 will provide an electronic map according to the plurality of position data. However, if the user drives to an unknown position, which is not shown on the electronic map provided by the map data unit 18 of the navigation device 12, the micro-processing unit 20 of the navigation device 12 determines that the map data unit 18 cannot provide an electronic map corresponding to the unknown position. Then, the micro-processing unit 20 stores the unknown position data to the data feedback unit 22 (Step 302). Afterwards, when the navigation device 12 transmits data to the server 14, the micro-processing unit 20 controls the first signal transmitting unit 24 to transmit the unknown position data stored in the data feedback unit 22 to the server 14 at the same time (Step 304). Accordingly, the server 14 can refer to the unknown position data to establish new road while updating the map data.

Figure 4:
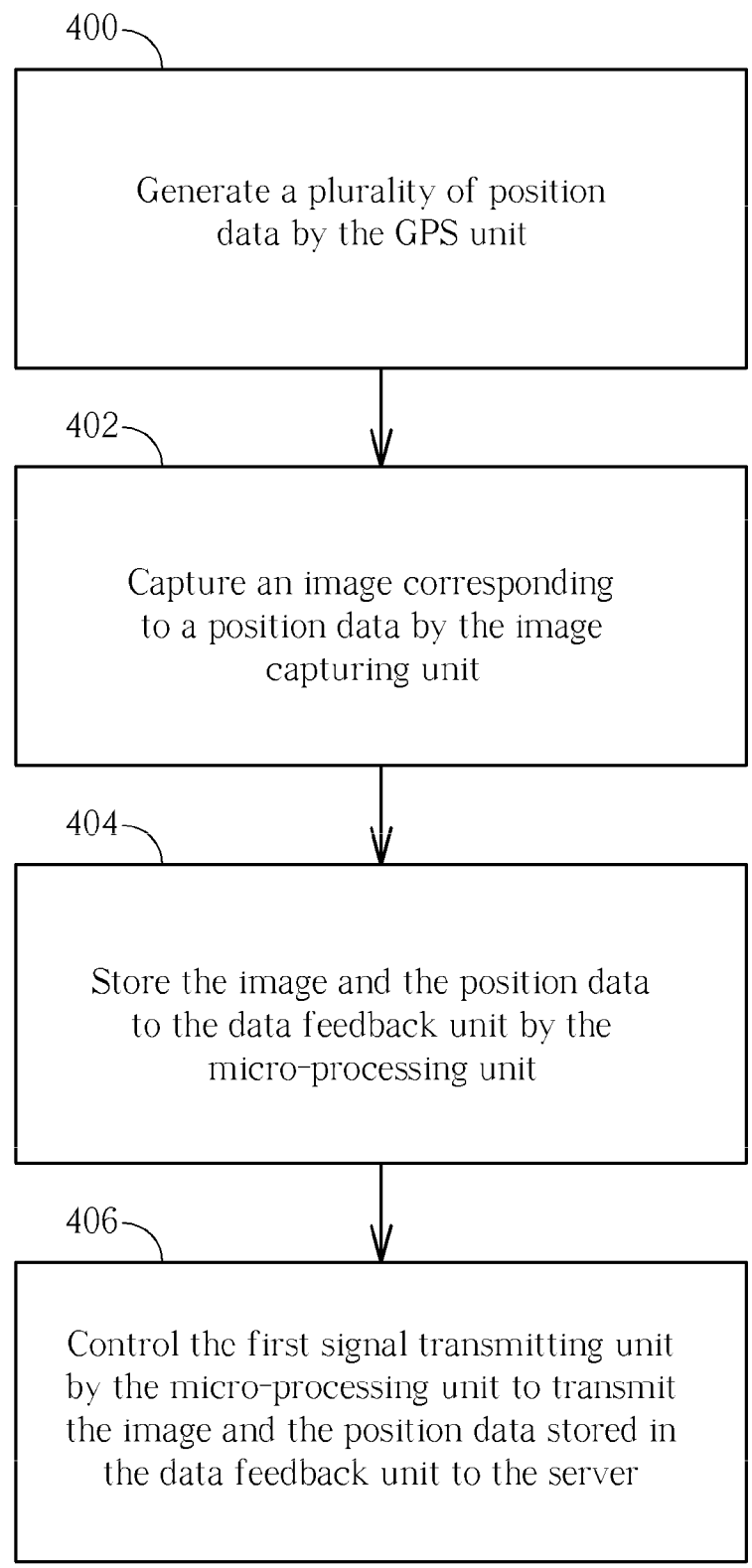
FIG. 4 is a flowchart illustrating a method of updating position information according to the present invention.

The function of updating position information will be depicted in detail as follows. Referring to FIG. 4, FIG. 4 is a flowchart illustrating a method of updating position information according to the present invention. The method comprises the following steps.

Step 400: Generate a plurality of position data by the GPS unit 16.

Step 402: Capture an image corresponding to a position data by the image capturing unit 32.

Step 404: Store the image and the position data to the data feedback unit 22 by the micro-processing unit 20.

Step 406: Control the first signal transmitting unit 24 by the micro-processing unit 20 to transmit the image and the position data stored in the data feedback unit 22 to the server 14.

When the user switches the navigation device 12 on, the GPS unit 16 of the navigation device 12 will generate a plurality of position data according to the driving path (Step 400), and the map data unit 18 of the navigation device 12 will provide an electronic map according to the plurality of position data. However, when the user finds that a point of interest (POI), such as a new gas station or a closed store, shown in the electronic map does not correspond with real situation, he or she can uses the image capturing unit 32 of the navigation device 12 to capture an image of the POI (Step 402). At the same time, the micro-processing unit 20 stores the position data (e.g. longitude and latitude) of the POI provided by the GPS unit 16 and the image captured by the image capturing unit 32 to the data feedback unit 22 (Step 404). Then, the micro-processing unit 20 controls the first signal transmitting unit 24 to transmit the image and the position data stored in the data feedback unit 22 to the server 14 while the navigation device 12 transmits data to the server 14 (Step 406). Furthermore, to prevent the user from actuating the image capturing unit 32 incautiously, the server 14 executes function of recognition automatically or manually according to the returned data from each navigation device 12 while an amount of returned data corresponding to a single position exceeds a predetermined value, so as to establish a new POI or delete a wrong POI while updating the map data.

In the prior art, the service provider has to assign operating staff to examine and correct the map data. However, the invention utilizes a built-in data feedback unit of the navigation device to store data, such as driving path, unknown position data, POI image data, and so on, for updating the map data. Also, the navigation device of the invention can transmit the stored data to the server, so as to actively provide related data for the server while updating the map data. Since the navigation system of the invention can gather statistics of optimum paths, report back unknown positions, and capture images of incorrect positions, the map data can show real situation on the road more accurately. Furthermore, since the navigation device can feed back related data, the map data can be updated by the navigation device more quickly.

Those skilled in the art will readily observe that numerous modifications and alterations of the device and method may be made while retaining the teachings of the invention.

What is claimed is:

1. A navigation system capable of updating map data comprising:
  a plurality of navigation devices, each of which comprising:
    a global positioning system unit for generating a plurality of position data;
    a map data unit for providing at least one electronic map corresponding to the plurality of position data;
    a micro-processing unit, coupled to the global positioning system unit and the map data unit, for generating at least one path data according to the plurality of position data and the electronic map;
    a data feedback unit, coupled to the micro-processing unit, for storing the path data; and
    a first signal transmitting unit, coupled to the data feedback unit, for outputting the path data; and
  a server comprising:
    a second signal transmitting unit for receiving a plurality of path data transmitted from a plurality of first signal transmitting units of the plurality of navigation devices;
    a calculating unit, coupled to the second signal transmitting unit, for calculating an optimum path data according to the plurality of path data received by the second signal transmitting unit; and
    an updating unit, coupled to the calculating unit, for updating the map data unit according to the optimum path data.

2. The navigation system of claim 1, wherein the navigation device further comprises a user interface, coupled to the micro-processing unit, for inputting commands to control the first signal transmitting unit to transmit the path data stored in the data feedback unit to the server.

3. The navigation system of claim 2, wherein the user interface is a touch screen.

4. The navigation system of claim 1, wherein each path data comprises a time data, and the calculating unit calculates the optimum path data corresponding to different time spans according to the plurality of path data.

5. The navigation system of claim 1, wherein each path data comprises a time data, and the calculating unit estimates a required time corresponding to the optimum path data according to the plurality of path data.

6. The navigation system of claim 1, wherein the micro-processing unit stores an unknown position data into the data feedback unit while the map data unit is unable to provide an electronic map corresponding to the unknown position data, and the micro-processing unit controls the first signal transmitting unit to transmit the unknown position data stored in the data feedback unit to the server thereafter.

7. The navigation system of claim 1, wherein the navigation device further comprises an image capturing unit, coupled to the micro-processing unit, for capturing an image corresponding to a position data, the micro-processing unit stores the image and the position data into the data feedback unit, and the micro-processing unit controls the first signal transmitting unit to transmit the image and the position data stored in the data feedback unit to the server thereafter.

8. The navigation system of claim 7, wherein the image capturing unit is a camera.

9. The navigation system of claim 1, wherein the micro-processing unit controls the data feedback unit to delete related position data within a specific range away from the initial position data or the terminational position data when an amount of initial position data or terminational position data of the plurality of path data stored in the data feedback unit exceeds a predetermined value.

10. The navigation system of claim 9, wherein the navigation device further comprises a user interface, coupled to the micro-processing unit, for inputting commands to adjust the predetermined value and the specific range.

11. A method for updating map data comprising:
generating a plurality of position data by a plurality of navigation devices respectively;
generating at least one path data by each navigation device according to the plurality of position data thereof and at least one electronic map corresponding to the plurality of position data;
transmitting the path data to a server by each navigation device;
calculating at least one optimum path data by the server according to a plurality of path data; and
updating the plurality of navigation devices by the server according to the optimum path data.

12. The method of claim 11, wherein the calculating step comprises calculating the optimum path data corresponding to different time spans by the server according to time data of the plurality of path data.

13. The method of claim 11, wherein the calculating step comprises estimating a required time corresponding to the optimum path data by the server according to time data of the plurality of path data.

14. The method of claim 11, further comprising transmitting an unknown position data to the server while each navigation device is unable to provide an electronic map of the unknown position data.

15. The method of claim 11, further comprising:
capturing an image corresponding to a position data by the navigation device; and
transmitting the image and the position data to the server by the navigation device.

16. The method of claim 11, further comprising deleting related position data within a specific range away from initial position data or terminational position data by the navigation device when an amount of the initial position data or the terminational position data of the plurality of path data exceeds a predetermined value.

* * * * *